United States Patent [19]

Pagnon

[11] Patent Number: 5,366,136
[45] Date of Patent: Nov. 22, 1994

[54] PROCESS FOR FORMING A COATING ON A SUPERALLOY COMPONENT, AND THE COATED COMPONENT PRODUCED THEREBY

[75] Inventor: Claude A. C. Pagnon, Voinsles, France

[73] Assignee: Societe Nationale d'Etude et de Construction de Moteurs d'Aviation "Snecma", Paris, France

[21] Appl. No.: 65,763

[22] Filed: May 24, 1993

[30] Foreign Application Priority Data

May 27, 1992 [FR] France .................. 92 06474

[51] Int. Cl.$^5$ ............................. B23K 31/02
[52] U.S. Cl. ................ 228/119; 228/193; 228/246; 228/256; 228/56.3; 427/383.7; 427/405
[58] Field of Search ............ 228/119, 176, 193, 246, 228/256, 13, 56.3; 427/383.7, 405

[56] References Cited

U.S. PATENT DOCUMENTS

| | | |
|---|---|---|
| 3,849,865 | 11/1974 | Gedwill et al. ............ 228/193 |
| 4,005,988 | 2/1977 | Paulonis et al. . |
| 4,117,179 | 9/1978 | Jackson et al. ............ 427/405 |
| 4,705,203 | 11/1987 | McComas et al. ............ 228/119 |
| 5,021,629 | 6/1991 | Shimomura . |
| 5,236,116 | 8/1993 | Solanki et al. ............ 228/178 |

FOREIGN PATENT DOCUMENTS

| | | |
|---|---|---|
| 0149942 | 7/1985 | European Pat. Off. . |
| 2147512 | 3/1973 | France . |
| 2397259 | 2/1979 | France . |
| 2511908 | 9/1984 | France . |

*Primary Examiner*—Samuel M. Heinrich
*Attorney, Agent, or Firm*—Oblon, Spivak, McClelland, Maier & Neustadt

[57] ABSTRACT

A component made of superalloy is provided with a localized coating formed from three layers by a brazing heat treatment, the layers comprising an outer layer having a composition adapted to the specific surface properties sought, an inner layer having a composition which includes flux elements, and an intermediate layer obtained by the deposition of a mixture of the materials used for the other two layers.

8 Claims, 1 Drawing Sheet

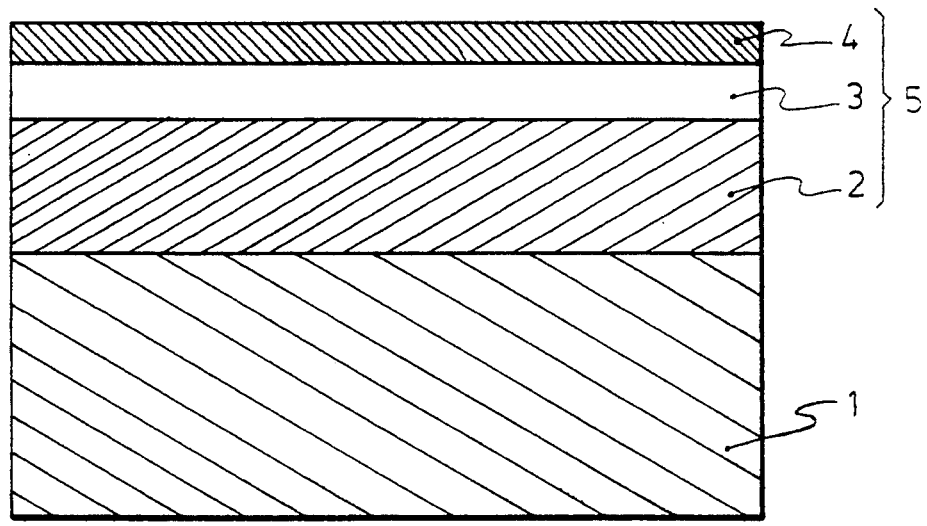
FIG:1
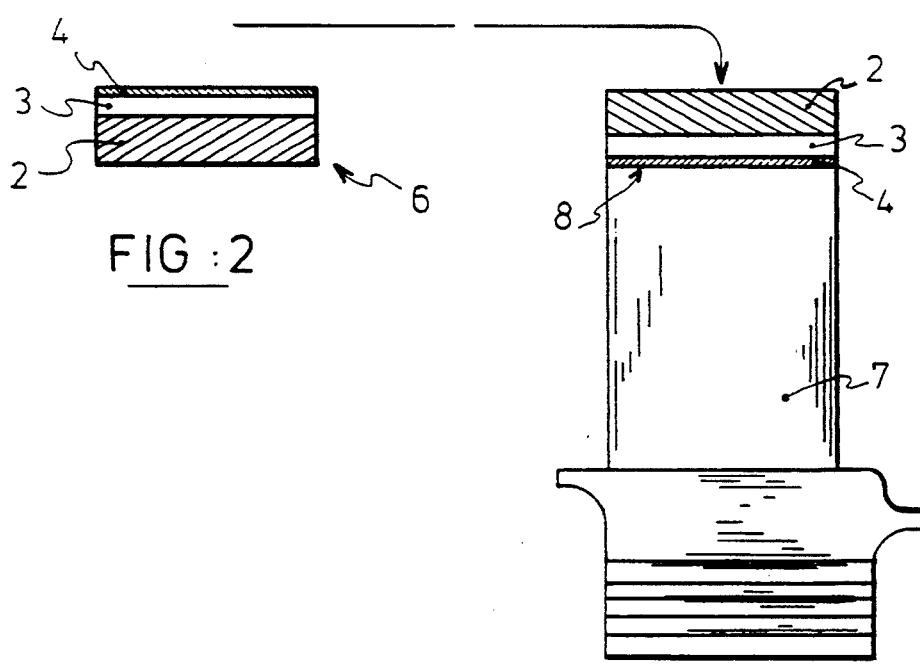
FIG:2
FIG:3

PROCESS FOR FORMING A COATING ON A SUPERALLOY COMPONENT, AND THE COATED COMPONENT PRODUCED THEREBY

BACKGROUND OF THE INVENTION

1. Field of the Invention

The present invention relates to a process for forming a coating on a localized area of a superalloy component especially such components intended for use aeronautical applications such as aircraft engines. The invention relates also to the coated component thus obtained, as well as to the composition of the three layer deposit used in forming the coating.

2. Summary of the Prior Art

It is known in numerous applications to improve the service life of components by applying a coating to a localized area of the component so as to improve the surface properties in that area depending on the specific stresses or contacts to be encountered. Examples of surface treatment techniques of this type are described in FR-A-2 397 259, which proposes the deposition by fusion welding of a coating of an alloy which withstands cracking at the tip of a blade, followed by a layer of an alloy which is hard and/or resistant to oxidation corrosion. Also known from FR-A-2 511 908 is a diffusion brazing process involving the application to a nickel or cobalt based superalloy part of an elementary part in the form of a presintered blank made from a mixture of two powders, one of which, termed the coating layer powder, is present between 5 and 25% by weight of the mixture and comprises a base of nickel, chromium and boron, nickel, cobalt, silicon and boron. Furthermore, US-A-4 705 203 discloses a process for making good the surface defects of superalloy components involving the plasma flame spraying of two successive layers of different compositions, then heat treatment during which only the first layer is melted and the surface layer is then obtained.

The manufacturing techniques described in FR-A-2 511 908 require, in particular, the use of a homogeneous mixture of powders to prepare a self-brazable sintered material for application by brazing to form a coating on a localized area of a superalloy component. In this case, the maximum temperature at which the superalloy component may be used must remain substantially lower than the brazing temperature.

One of the aims of the invention is to produce, by brazing, a coating on at least one localized area of a superalloy component which will permit the superalloy component to be used at a temperature equal to, greater than, the brazing temperature. This problem stems in particular from the use of some superalloys which do not tolerate a heat treatment cycle at a temperature greater than their normal temperature of use, and is encountered especially in certain aeronautical applications such as aircraft engine components made of monocrystalline alloys, one example of which is given in EP-A-149 942. No fully satisfactory solution to this problem has yet been proposed in the art.

SUMMARY OF THE INVENTION

With a view to remedying the situation, according to the invention there is provided a superalloy component having at least one localized area provided with a coating which is formed from three layers by a brazing heat treatment cycle, the three layers comprising an outer layer of a first material selected to provide the component with the desired operational surface properties in said localized area, an inner layer of a second material including elements and selected to procure the melting of the inner layer and then its solidification during the brazing heat treatment cycle, and an intermediate layer obtained from deposition of a mixture of the first and second materials. In one process for forming the coating on the superalloy component the inner layer, the intermediate layer and the outer layer are deposited in succession directly onto the component by plasma flame spraying, and are then subjected to the brazing heat treatment cycle, temperature and duration of which are determined experimentally according to the materials used in the layers.

Preferably, the plasma flame spraying is carried out in a sealed enclosure, under partial pressure in a controlled atmosphere.

An alternative process for forming the coating, which is advantageous when the situation of the localized area of the component to be coated brings about accessibility problems and/or when the limit of the said area leads to losses of powder in the course of spraying, comprises the following successive steps:

(a) depositing in succession onto a metallic support by plasma flame spraying in powder form firstly the first material, then a mixture of the first and second materials, and finally the second material, to form said three layers of the coating on the support with the outer layer in contact with the support;

(b) removing the three-layer deposit formed in step (a) from the support by a method which imposes substantially no mechanical stress on the deposit;

(c) cutting out a part from the deposit having a shape corresponding to the localized area of the component which is to be coated, by a method which does not impose any mechanical stress on the shaped part so obtained; and (d) placing the shaped part obtained in step (c) in position on the localized area of the component with the layer formed by the second material in contact with the component, and carrying out the brazing heat treatment cycle following temperature and duration conditions dependent on the materials used in forming the layers.

One embodiment of a process in accordance with the invention will now be described, by way of example, with reference to the accompanying drawings.

BRIEF DESCRIPTION OF THE DRAWINGS

FIG. 1 is a diagrammatic sectional view through a support on which there is applied a three-layer deposit in a first stage of the process;

FIG. 2 is a view similar to that of FIG. 1 but showing the deposit separated from the support to provide a preform of self-brazable material having a laminated structure; and, FIG. 3 is a diagrammatic view of a superalloy component on which the preform shown in FIG. 2 is placed prior to brazing to form the coating in the final stage of the process.

DESCRIPTION OF THE PREFERRED EMBODIMENT

The process illustrated in the drawings for the production of a coating on at least one localized area of a superalloy component comprises the following steps.

(a) Three layers 2, 3 and 4 are deposited successively by plasma flame spraying on a metallic support 1 as shown in FIG. 1. Firstly the layer 2 is deposited directly on the support 1 using a powder having a composition which enables a material to be obtained having properties which correspond to the desired functional surface properties for the part to be coated. Then an intermediate layer 3 is deposited from a mixture of the powders used to produce the other two layers, and finally the layer 4 is deposited using a powder of which the constituent material comprises flux elements and corresponds to a brazing alloy.

(b) The three-layer deposit 5 is then separated from the support 1 using a removal method which does not introduce any mechanical stress into the deposit 5, and which may be known per se.

(c) At least one shaped part or preform 6, such as diagrammatically shown in FIG. 2, having contours which correspond to the geometry of the localized area of the component to be coated is then cut out from the separated deposit 5 using a method which may be known per se and does not introduce any mechanical stress into the part 6.

(d) The shaped part 6 thus obtained is then set in place on the localized area 8 of the component 7 to be coated as shown in FIG. 3, and a heat treatment cycle is carried out to braze the part 6 onto the component to form the desired coating.

The choice of the metallic support 1 is made so as to prevent the development of internal stresses in the deposited layers which could lead to delamination of the layers.

EXAMPLE A

The layer 2 is deposited using a powder possessing the following properties:
grain size less than 45 μm
chemical composition as percentages by weight:
Ni: 31–33
Cr: 20–22
Al: 7–9
Y: 0.35–0.65
Co: remainder to 100

The thickness deposited is 1 mm and the porosity rate in the layer is less than 3%. The deposit obtained in this case exhibits remarkable anti-oxidation properties.

The thickness of the layer 3 deposited is 0.10 mm. As previously indicated, the sprayed powder is composed of a mixture of the powders used to obtain the layers 2 and 4 respectively. The deposit is obtained by a multi-pass operation, progressively varying the composition from one pass to the next so that it starts from the composition of layer 2 and ends with the composition of layer The layer 4 has a thickness of 0.05 mm and is deposited using a brazing alloy powder possessing the following properties:
nominal grain size: 125 μm;
chemical composition as percentages by weight of principal elements:
Cr: 14–16
B: 3.2–4.0
Ni: remainder to 100;
melting point: 1055° C.

Preferably the plasma flame spraying is carried out under partial pressure, of the order of $10^4$Pa, in a protective neutral gas such as argon.

The brazing operation in this case is carried out by holding the temperature at 1100° C. for four hours. Differential heat analysis measurements have made it possible to determine the remelting temperature in the brazed area, and a solidus temperature of 1300° C. and a liquidus temperature of 1340° C. are obtained.

EXAMPLE B

When anti-wear properties are required for the surface of the component a cobalt-based alloy may be used to form the layer 2, for example using a powder possessing the following properties:
nominal grain size: below 53 μm,
chemical composition as percentages by weight of the principal elements:
Cr: 24.5–26.5
Ni: 9.5–11.5
Mo: 6.5–8.0
C: 0.43–0.55
Co: remainder to 100.

The thickness deposited is 1 mm and the porosity rate in the layer is below 3%.

Among the known methods suitable for the removal of the deposit 5 from the support 1 in step (b) of the process are cutting by electro-erosion with wire, which enables the support to be re-used, and chemically dissolving the support 1.

The known cutting methods which may be used in step (c) of the process are adapted in particular to the thicknesses involved, and include laser cutting, cutting with a water jet, and cutting by electro-erosion with wire.

When setting the preform 6 in place on the localized area of the component 7 to be coated in step (d) of the process, the layer 4 formed by the brazing alloy must be placed in contact with the said component 7 as shown in FIG. 3.

The conditions for carrying out the brazing heat treatment in step (d) of the process, particularly the temperatures and duration of the cycle and the atmosphere, may be known per se for the materials used or may be established experimentally depending on the materials.

In the structure of the coating obtained on the component 7 the layer 4 melts at the start of the brazing cycle, then solidifies as a result of the diffusion of the flux elements, principally into the layer 3. The said layer 3 is homogenized by the diffusion between the elements originating from layer 2 and the elements originating from layer 4. During the brazing cycle, and particularly in the areas close to the layer 4, transient liquid phases may appear. The layer 2 retains a structure very close to that which is obtained after spraying in step (a) of the process.

The principal advantages of the structure obtained for the coating on the component 7 are, on the one hand, provision of the specific functional surface properties sought, such as anti-oxidation in example A and anti-wear in example B described above, at the outer layer 2 of the coating while, on the other hand, ensuring that the inner layer 4 has a remelting temperature higher than the temperature reached during the brazing heat treatment cycle in step (d) of the process, which permits use of the component 7 at a temperature greater than the brazing temperature.

These advantages may be of particular interest carrying out repair operations on the superalloy components.

The coating process of the invention which has just been described with reference to FIGS. 1 to 3 is particularly advantageous for applications where the localized area of the component to be coated is difficult to get at for effecting a direct deposition by plasma flame spraying, or when the particular geometry of the area to be coated would lead to substantial losses of powder, particularly at edge areas of the component, during direct spraying.

FIG. 3, which shows an area to be coated at the top 8 of a component 7 in the form of a turbine blade, is one example where the procedure described permits substantial savings in powder.

However, in the applications where the surface to be coated is substantial and good accessibility permits direct spraying, the coating may be formed by direct plasma flame spraying of the three successive layers onto the component to be coated, followed by the brazing operation.

I claim:

1. A process for forming a coating on at least one localized area of a superalloy component, said process comprising the following successive steps:
   (a) depositing an inner layer of a material including flux elements on said localized area by plasma flame spraying said material directly onto said localized area;
   (b) depositing an intermediate layer comprising a mixture of materials on said inner layer by plasma flame spraying;
   (c) depositing on said intermediate layer by plasma flame spraying an outer layer of a material selected to provide said component with the desired operational surface properties in said localized area;
   (d) subjecting said layers deposited in steps (a), (b) and (c) to a brazing heat treatment cycle wherein the temperature and duration are determined experimentally according to the materials used in said layers;
   said material forming said inner layer being selected to procure the melting of said inner layer and then its solidification during said brazing heat treatment cycle, and said mixture of materials forming said intermediate layer consisting of a mixture of said materials used for said inner and outer layers.

2. A process for forming a coating on at least one localized area of a superalloy component, comprising the following successive steps:(a)
   (a) providing a metallic support;
   (b) plasma flame spraying a first material in powder form onto said metallic support to deposit a first layer of said first material on said support, said first material being selected to provide said component with the desired operational surface properties in said localized area;
   (c) plasma flame spraying in powder form a mixture of said first material and a second material including flux elements onto said first layer to form a second layer;
   (d) plasma flame spraying said second material in powder form onto said second layer to form a third layer;
   (e) removing the three-layer deposit formed by steps (b), (c) and (d) from said support by a method which imposes substantially no mechanical stress on said three-layer deposit;
   (f) cutting out a part from said three-layer deposit having a shape corresponding to said localized area said component which is to be coated, by a method which does not impose any mechanical stress on the shaped part so obtained;
   (g) placing said shaped part obtained in step (f) in position on said localized area of said component with said third layer formed by said second material in contact with said component;
   (h) subjecting at least said localized area and said placed shaped part to a brazing heat treatment cycle following temperature and duration conditions dependent on the materials used in forming said layers, said second material being selected to procure melting of said third layer in contact with said component and then its solidification during said brazing heat treatment cycle.

3. A process according to claim 1 or claim 2, wherein said plasma flame spraying is carried out in a sealed enclosure and under partial pressure in a controlled atmosphere.

4. A process according to claim 2, wherein the removal of said three-layer deposit from said support in step (e) is carried out by wire electro-erosion.

5. A process according to claim 2, wherein the removal of said three-layer deposit from said support in step (e) is carried out by chemically dissolving said support.

6. A process according to claim 2, wherein the cutting out of said shaped part in step (f) is carried out by laser cutting.

7. A process according to claim 2, wherein the cutting out of said shaped part in step (f) is carried out by water jet cutting.

8. A process according to claim 2, wherein the cutting out of said shaped part in step (f) is carried out by wire electro-erosion.

* * * * *

UNITED STATES PATENT AND TRADEMARK OFFICE
CERTIFICATE OF CORRECTION

PATENT NO. : 5,366,136

DATED : November 22, 1994

INVENTOR(S) : Claude A.C. PAGNON

It is certified that error appears in the above-identified patent and that said Letters Patent is hereby corrected as shown below:

Column 1, line 10, "for use aeronautical" should read --for use in aeronautical--.

Column 2, line 3, "including elements" should read --including $_{flux}$ elements--.

Column 3, line 55, "layer" should read -- $_{layer\ 4}$.--

Column 5, line 48, delete "(a)".

Column 6, lines 16-17, "area said" should read --area of said--.

Signed and Sealed this

Twelfth Day of September, 1995

Attest:

BRUCE LEHMAN

Attesting Officer     Commissioner of Patents and Trademarks